United States Patent
Peng et al.

(10) Patent No.: US 8,079,714 B2
(45) Date of Patent: Dec. 20, 2011

(54) PROJECTOR AND METHOD FOR ACQUIRING COORDINATE OF BRIGHT SPOT

(75) Inventors: Shaoping Peng, Beijing (CN); Yiqiang Yan, Beijing (CN); Zifeng Hou, Beijing (CN); Bo Liu, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 590 days.

(21) Appl. No.: 12/161,154

(22) PCT Filed: Jan. 17, 2007

(86) PCT No.: PCT/CN2007/000169
§ 371 (c)(1),
(2), (4) Date: Dec. 16, 2008

(87) PCT Pub. No.: WO2007/082469
PCT Pub. Date: Jul. 26, 2007

(65) Prior Publication Data
US 2010/0149436 A1 Jun. 17, 2010

(51) Int. Cl.
*G03B 21/00* (2006.01)
(52) U.S. Cl. ............ 353/42; 353/30; 353/31; 353/34; 353/35; 353/74; 353/69; 353/70; 353/98; 353/119; 345/173; 345/175; 345/178; 345/179
(58) Field of Classification Search .......... 353/30, 353/31, 34, 35, 74, 77, 69, 70, 42, 98, 119; 250/559.19, 559.31, 559.32, 206.1, 559.29, 206.2, 221, 559.38; 356/152.2, 141.1, 3.01; 345/173, 175, 178, 179
See application file for complete search history.

(56) References Cited

U.S. PATENT DOCUMENTS

| | | | | |
|---|---|---|---|---|
| 5,581,637 A * | 12/1996 | Cass et al. | ...................... | 382/284 |
| 5,738,429 A * | 4/1998 | Tagawa et al. | ................ | 353/122 |
| 5,772,299 A * | 6/1998 | Koo et al. | ........................ | 353/20 |
| 6,100,538 A * | 8/2000 | Ogawa | ...................... | 250/559.29 |
| 6,382,798 B1 * | 5/2002 | Habraken | ..................... | 353/122 |
| 6,707,444 B1 | 3/2004 | Hendriks et al. | | |
| 7,355,584 B2 * | 4/2008 | Hendriks et al. | ............. | 345/156 |
| 2002/0042699 A1 * | 4/2002 | Tanaka et al. | ..................... | 703/2 |
| 2005/0083301 A1 * | 4/2005 | Tamura | ......................... | 345/158 |

FOREIGN PATENT DOCUMENTS

| | | |
|---|---|---|
| JP | 2004252118 A | 9/2004 |
| JP | 2005128611 A | 5/2005 |
| JP | 2005277931 A | 10/2005 |

\* cited by examiner

*Primary Examiner* — Georgia Y Epps
*Assistant Examiner* — Sultan Chowdhury
(74) *Attorney, Agent, or Firm* — Kinney & Lange, P.A.

(57) ABSTRACT

A projector for acquiring a coordinate of a bright spot includes a half transparent and half reflecting mirror (22), an imaging device (24), and a processing system (25). The half transparent and half reflecting mirror (22) is provided on a light path between the light source (21) and the zooming system (23). The imaging device (24) captures an external light ray reflected by the half transparent and half reflecting mirror (22). The processing system (25) acquires the coordinate of the bright spot according to the image of the image of the bright spot captured by the imaging device.

13 Claims, 3 Drawing Sheets

PROJECTOR AND METHOD FOR ACQUIRING COORDINATE OF BRIGHT SPOT

BACKGROUND OF THE INVENTION

1. Field of Invention

The present invention relates to a projector technology, more specifically, to a projector and a method for acquiring a coordinate of a bright spot.

2. Description of Related Art

In performing projection by a projector, a high brightness point light source, such as a laser point light source and an LED spot, is usually needed to project a bright spot onto a projection area of the projector, so as to facilitate a demonstrator's demonstrating. Meanwhile, to further facilitate the demonstrating, it is desired that the projector not only can independently complete many works that otherwise would be accomplished depending on a computer previously, such as marking on a projected document; but also can communicate with a computer operating to perform the projection, such that the projector may automatically accomplish many complicated functions that otherwise would be accomplished on the computer by the demonstrator, such as page turning, mouse moving, button clicking and the like. Therefore, it is necessary for the projector to acquire the coordinate of the laser spot projected by the demonstrator, so as to achieve the functions such as marking, page turning, mouse moving, button clicking and the like as described above.

Currently, there are two solutions for acquiring the coordinate of the bright spot (the coordinate of the laser spot) by utilizing the projector.

FIG. 1 is a schematic diagram showing a structure of a system for acquiring the coordinate of the laser spot according to the first solution in the prior art.

As shown in FIG. 1, the system for acquiring the coordinate of the laser spot comprises a projector 1, a camera 2, and a computer 3. The computer 3 comprises a video capture card 31 and a video display card 32. The video capture card 31 is connected to the camera 2, the video display card 32 is connected to the projector 1, and the camera 2 is placed directly above the projector 1.

When the demonstrator uses the projector 1 to perform projection, and also uses a laser point light source to project the laser spot onto the projection area, the camera 2 first takes an image of the laser spot, and then sends the taken laser spot image to the video capture card 31.

The video capture card 31 performs capture on the received laser spot image, to thereby obtain the captured laser spot image information.

The computer 3 processes the captured laser spot image information by using a laser spot real-time detecting program running in the computer 3, according to the laser spot image received by the video capture card 31, and then obtains the coordinate of the laser spot for operating the projector 1 connected thereto.

The main disadvantages for this solution lie in that, it is the computer system that acquires the laser spot information, and the projector itself can not acquire the position of the laser spot; and if the projector 1 is moved away from the selected computer system, it does not have the function for acquiring the position of the laser spot.

FIG. 2 is a schematic diagram showing a structure of a system for acquiring the coordinate of the laser spot according to the second solution in the prior art.

As shown in FIG. 2, the system for acquiring the coordinate of the laser spot comprises a projector 1, a camera 2, a computer 3, a charge-coupled device (CCD) 4, and a processing system 5, wherein, the computer 3 comprises a video display card 32 connected to the camera 1, for performing projection operation.

In the second solution, the camera 2 is placed beside the camera 1, and a laser spot image taken by the camera 2, after being imaged in the CCD 4, is input into the processing system 5.

Since the processing system 5 operates independently of the computer 3, it can not directly obtain the imaging size and position on the CCD 4 for the image projected by the projector 1. The processing system 5 has to use an image edge extraction algorithm to determine the imaging size and position, and finally obtains the coordinate of the laser spot after complicated computations.

The main disadvantages for this solution lie in that, since the imaging size and position on the CCD or other imaging devices, such as a CMOS (COMPLEMENTARY METAL OXIDE SEMICONDUCTOR) device and a JFET (JUNCTION FIELD-EFFECT TRANSISTOR) device, for the image projected by the projector are unknown, it is necessary to first use the image edge extraction algorithm to determine the imaging size and position, and then obtain the coordinate of the laser spot after complicated computations, thus resulting in a low speed and a low accuracy.

Therefore, in view of the disadvantages of the solutions as described above, it is necessary to design a projector for acquiring the coordinate of the laser spot, which can be used independently and expediently without relying on the computer system, and can acquire the coordinate of the laser spot in a simple, fast and accurate manner.

SUMMARY OF THE CERTAIN INVENTIVE ASPECTS

An aspect of the present invention is to provide a projector for acquiring a coordinate of a bright spot, so as to acquire the coordinate of the bright spot in a simple, fast and accurate manner.

Another aspect of the present invention is to provide a method for acquiring a coordinate of a bright spot, so as to acquire the coordinate of the bright spot in a simple, fast and accurate manner.

According an aspect of the present invention, there is provided a projector for acquiring a coordinate of a bright spot, comprising a light source for projecting and a zooming system, a light ray emitted from the light source being projected onto a projection area via the zooming system, the projector comprising: a half transparent and half reflecting mirror provided on a light path between the light source and the zooming system, wherein a light ray along the light path is incident on the half transparent and half reflecting mirror at a certain incident angle, the half transparent and half reflecting mirror is adapted to transmit the light emitted from the light source to the zooming system and also to reflect an external light ray, which is reflected from the projection area and then incident on the half transparent and half reflecting mirror via the zooming system, wherein the external light ray comprises a projection image and a bright spot image of the bright spot incident on the projection image; an imaging device or imager for capturing the external light ray reflected by the half transparent and half reflecting mirror; and a processing system or processor for acquiring the coordinate of the bright spot according to the bright spot image captured by the imaging device or imager.

According to said another object of the present invention, there is provided a method for acquiring a coordinate of a bright spot by using the projector as described above, comprising: capturing the external light ray reflected by the half transparent and half reflecting mirror, wherein the external light ray comprises a projection image and a bright spot image of the bright spot incident on the projection image; and acquiring the coordinate of the bright spot, according to the captured bright spot image.

The beneficial effects of the present invention lie in that, it is possible to acquire the coordinate of the bright spot in a simple, fast and accurate manner with the projector and the method for acquiring the coordinate of the laser spot according to the present invention, without relying on a computer system; as compared to traditional manners, combining the projector with a computer lowers the cost of the whole system; and the requirements for the imaging device, the projection area of the projector and its background are lowered.

DETAILED DESCRIPTION OF CERTAIN INVENTIVE EMBODIMENTS

Hereinafter a projector for acquiring a coordinate of a bright spot according to embodiments of the present invention will be described, in conjunction with the drawings.

Embodiment 1

Figure 1:
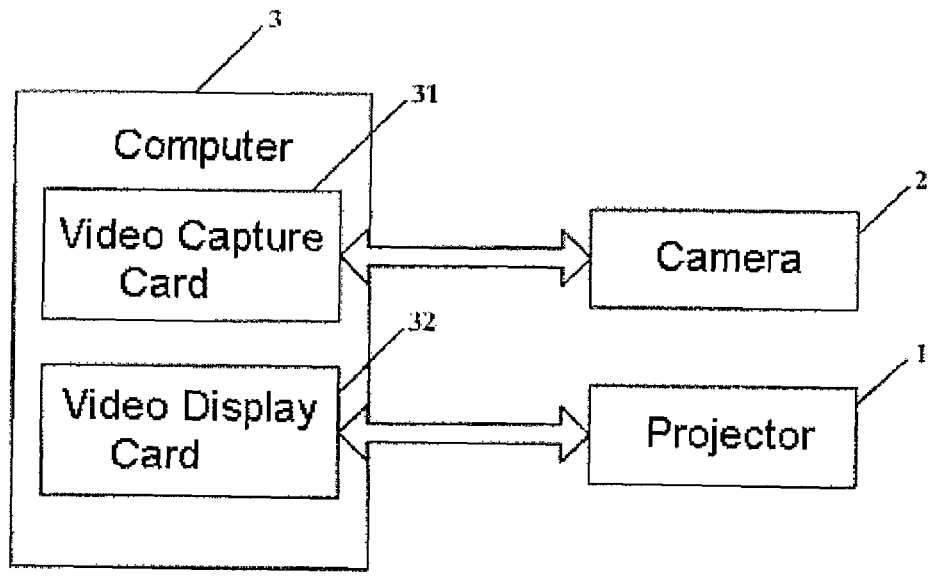
FIG. 1 is a schematic diagram showing a structure of a system for acquiring a coordinate of a laser spot in the prior art.
Figure 2:
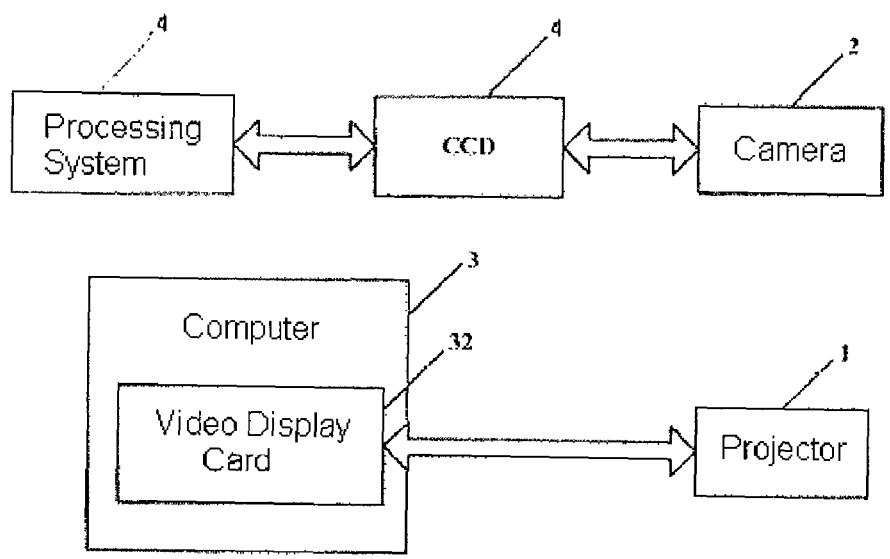
FIG. 2 is a schematic diagram showing a structure of another system for acquiring a coordinate of a laser spot in the prior art.
Figure 3:
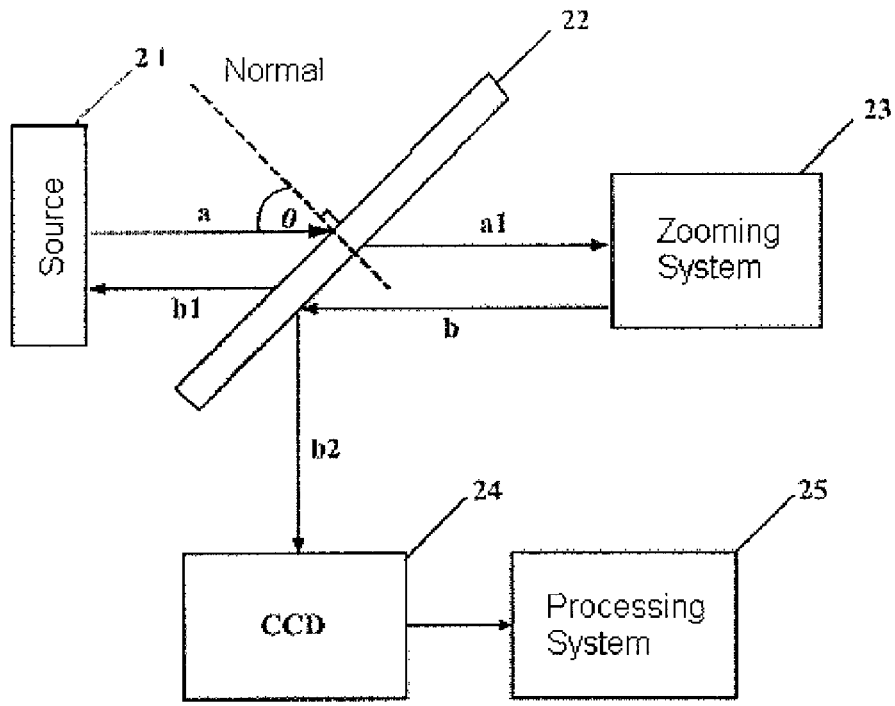
FIG. 3 is a schematic diagram showing a structure of a projector according to embodiment 1 of the present invention.

FIG. 3 is a schematic diagram showing a structure of a projector according to embodiment 1 of the present invention.

As shown in FIG. 3, the projector 1 according to embodiment 1 of the present invention comprises a light source 21, a half transparent and half reflecting mirror 22, a zooming system 23, a charge-coupled device (CCD) 24, and a processing system 25. The half transparent and half reflecting mirror 22 is a planar half transparent and half reflecting mirror, provided on a light path between the light source 21 and the zooming system 23, wherein a light ray along the light path is incident on the half transparent and half reflecting mirror 22 at a certain incident angle θ.

A light ray emitted from the light source 21 is projected onto a projection area (a screen or a wall surface, etc.) after passing through the half transparent and half reflecting mirror 22 and the zooming system 23.

An external light ray (comprising a projection image and an image of a laser spot projected on the projected image) reflected from the projection area is reflected to the CCD 24 after passing through the zooming system 23 and the half transparent and half reflecting mirror 22. The CCD 24 captures the image of the laser spot according to the received external light ray, obtains a laser spot image, and sends the laser spot image to the processing system 25 for processing, so as to acquire the coordinate of the laser spot.

The light source 21 and the zooming system 23 are the modules respectively for emitting light and for performing projection as included in existing projectors, and the zooming system 23 is a combination of lens, so the detailed descriptions thereof are omitted here.

Hereinafter, a flow for acquiring the coordinate of the laser spot by the projector according to embodiment 1 of the present invention will be described in detail, referring to FIG. 3.

a) The light ray a emitted from the light source 21 first is incident on the half transparent and half reflecting mirror 22 at the certain incident angle θ, then is partly reflected by the half transparent and half reflecting mirror 22 (not shown), and also is partly transmitted (the transmitted light ray is a1). Then the partly transmitted light ray a1 is incident on the zooming system 23.

Although the incident angle θ shown in FIG. 3 is about 45°, the incident angle θ may be any angle less than the total reflection angle of the half transparent and half reflecting mirror, i.e. any angle that will not cause the light rays emitted from the light source 21 to be totally reflected.

b) The transmitted light ray a1 enters the zooming system 23, passes through the zooming system 23 and projects an object to be projected, and then the projection image is projected onto the projection area (not shown).

c) The external light ray from the projection area passes through the zooming system 23, and then becomes a light ray b, which is then incident on the half transparent and half reflecting mirror 22, wherein the external light ray comprises the light rays due to the reflection of the projection image and the laser spot, which is projected by a demonstrator onto the projection area, from the projection area.

d) The light ray b (comprising the projection image and the image of the laser spot projected on the projection image) incident on the half transparent and half reflecting mirror 22 is partly transmitted through the half transparent and half reflecting mirror 22 (the transmitted light ray is b1), and also is partly reflected (the reflected light ray is b2). The reflected light ray b2 is incident on the CCD 24.

e) The CCD 24 performs capture according to the projection image and the laser spot image in the received light ray b2, obtains the captured projection image and laser spot image, and sends them to the processing system 25.

f) The processing system 25 processes the captured projection image and laser spot image sent from the CCD 24 (such as brightness comparing), and then obtains the coordinate of the laser spot.

Here, there may be another situation for the processes e) and f).

e') The CCD 24 performs capture according to the projection image and the laser spot image in the received light ray b2, but only obtains the captured laser spot image due to the too low brightness of the projection image, and thus only sends the captured laser spot image to the processing system 25.

f') The processing system 25 processes the captured laser spot image sent from the CCD 24 (for example, comparing the captured laser spot image with the capture range of the CCD 24), and then obtains the coordinate of the laser spot.

It should be appreciated that, the above laser spot may be other high brightness spots, such as an LED spot. Other imaging devices, such as a complementary metal oxide semiconductor (CMOS) device and a junction field-effect transistor (JFET) device, may also be adopted in stead of the CCD 24.

According to the above flow and structure, the projector according to embodiment 1 of the present invention can acquire the coordinate of the bright spot in a simple, fast and accurate manner, without relying on a computer system. As compared to traditional manners, combining the projector with a computer lowers the cost of the whole system. Further, the requirements for the imaging device, the projection area of the projector and its background are lowered because it is sufficient to only capture the laser spot image.

Embodiment 2

Figure 4:
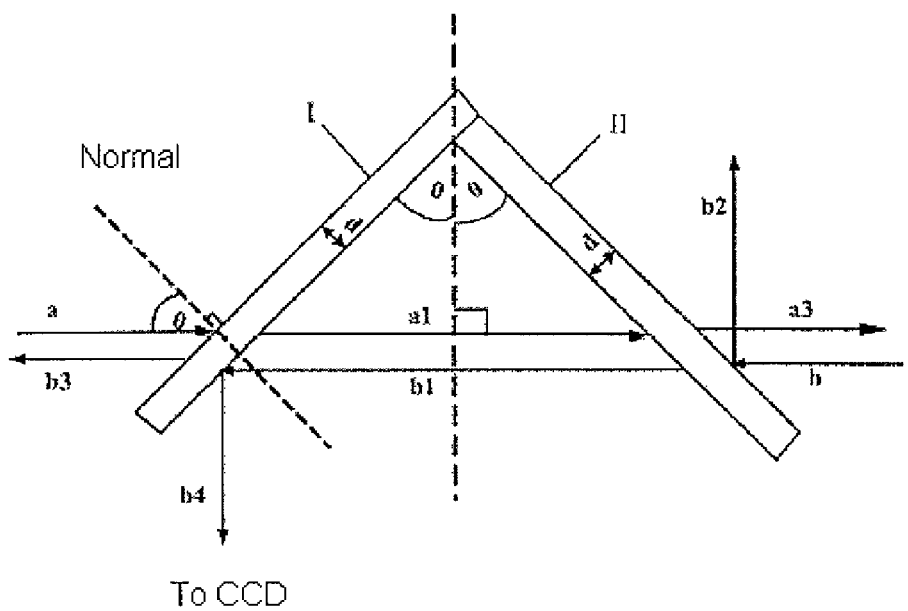
FIG. 4 is a diagram showing a light path for a half transparent and half reflecting mirror according to embodiment 2 of the present invention.

Referring to FIG. 4, the projector according to embodiment 2 of the present invention is substantially identical with the projector of embodiment 1 in structure, comprising a light source 21, a half transparent and half reflecting mirror 22, a zooming system 23, a charge-coupled device (CCD) 24, and a processing system 25. The only difference lies in that, the half transparent and half reflecting mirror 22 is a wedge-shaped half transparent and half reflecting mirror, rather than a planar half transparent and half reflecting mirror. Structures and functions of the other parts remain unchanged, and thus will not be described in detail.

FIG. 4 is a diagram showing a light path for the wedge-shaped half transparent and half reflecting mirror according to embodiment 2 of the present invention.

As shown in FIG. 4, the half transparent and half reflecting mirror 22 is formed of a half transparent and half reflecting mirror I and a half transparent and half reflecting is mirror II. A wedge angle of the wedge-shaped half transparent and half reflecting mirror 22, i.e. the included angle between the half transparent and half reflecting mirror I and the half transparent and half reflecting mirror II, is 2θ.

a) The light ray from the light source 21 is incident on the wedge-shaped half transparent and half reflecting mirror 22 at an incident angle θ. The light ray a is partly reflected by the half transparent and half reflecting mirror I of the half transparent and half reflecting mirror 22 (not shown in FIG. 4), and also is partly transmitted (the transmitted light ray is a1). Then the partly transmitted light ray a1 is incident on the half transparent and half reflecting mirror II of the half transparent and half reflecting mirror 22.

Although the incident angle θ shown in FIG. 4 is about 45°, the incident angle θ may be any angle less than the total reflection angle of the half transparent and half reflecting mirror, i.e. any angle that will not cause the light rays emitted from the light source 21 to be totally reflected.

b) The light ray a1, transmitted through the half transparent and half reflecting mirror I, is incident on the half transparent and half reflecting mirror II, then a part thereof is reflected (not shown), while another part thereof transmitted through the half transparent and half reflecting mirror II (the transmitted light ray is a3) enters the zooming system 23, projects the object to be projected, and then the projection image is projected onto the projection area.

c) The external light ray from the projection area becomes a light ray b after passing through the zooming system 23, and is incident on the half transparent and half reflecting mirror II of the half transparent and half reflecting mirror 22, wherein, the light ray b comprises the light rays due to the reflection of the projection image and the laser spot, which is projected by the demonstrator on the projection area, from the projection area.

d) A part of the light ray b incident on the half transparent and half reflecting mirror II (the transmitted light ray b1) is transmitted through the half transparent and half reflecting mirror II, and then is incident on the half transparent and half reflecting mirror I of the half transparent and half reflecting mirror 22, while another part (the reflected light ray b2) thereof is reflected.

e) The light ray lot transmitted through the half transparent and half reflecting mirror II, is incident on the half transparent and half reflecting mirror I, and then a part thereof (the transmitted light ray b3) is transmitted through the half transparent and half reflecting mirror I, while another part thereof (the reflected light ray b4) is incident on the CCD 24 after being reflected by the half transparent and half reflecting mirror I.

Then, the CCD 24 performs capture according to the projection image and the laser spot image in the received light ray b4, obtains the captured projection image and laser spot image, and sends them to the processing system 25. The processing system 25 processes the captured projection image and laser spot image sent from the CCD 24, (such as brightness comparing), and acquires the coordinate of the laser spot.

Alternatively, the CCD 24 performs capture according to the projection image and the laser spot image in the received light ray b4, but only obtains the captured laser spot image due to the too low brightness of the projection image, and thus only sends the captured laser spot image to the processing system 25. The processing system 25 processes the captured laser spot image sent from the CCD 24 (for example, comparing the captured laser spot image with the capture range of the CCD 24), and acquires the coordinate of the laser spot.

It should be appreciated that, the above laser spot may be other high brightness spots, such as an LED spot. Other imaging devices, such as a complementary metal oxide semiconductor (CMOS) device and a junction field-effect transistor (JFET) device, may also be adopted in stead of the CCD 24.

Moreover, the CCD 24 may have the reflected light ray b2 as described above incident on for performing capture on the laser spot image.

With the structure of the projector and the structure of the wedge-shaped half transparent and half reflecting mirror according to embodiment 2 of the present invention, it is possible to solve the problem that the light rays emitted from the projector will be subject to different refractions when passing through the normal half transparent and half reflecting mirror due to the too broad spectrum of the light source in the projector, thereby preventing the light rays from suffering form dispersions. Moreover, the acquiring of the coordinate of the bright spot does not rely on the computer system, and thus it is possible to acquire the coordinate of the bright spot in a simple, fast and accurate manner. As compared to the traditional manners, combining the projector with a computer lowers the cost of the whole system. Further the requirements for the imaging device, the projection area of the projector and its background are lowered because it is sufficient to only capture the laser spot image.

Additionally, in the above two embodiments, it is also possible to prevent the light rays from being subject to dispersions by reducing the thickness d of the half transparent and half reflecting mirror.

Modified Embodiment

Figure 5:
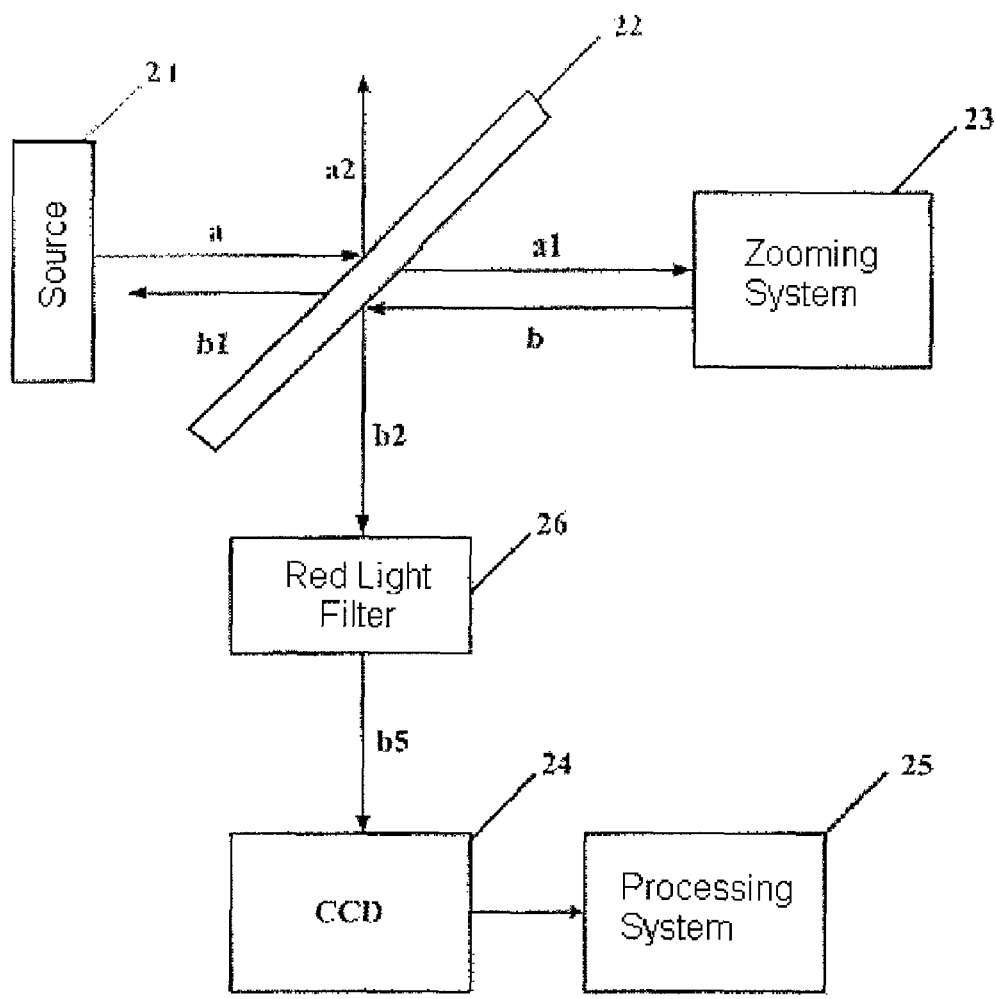
FIG. 5 is a schematic diagram showing a structure of a projector according to a modified embodiment of the present invention.

FIG. 5 is a schematic diagram showing a structure of a projector according to a modified embodiment of the present invention.

The projector according to the modified embodiment of the present invention is substantially identical with the projector of embodiment 1 shown in FIG. 3 in structure, comprising a light source 21, a half transparent and half reflecting mirror 22, a zooming system 23, a charge-coupled device (CCD) 24, a light filter 26, and a processing system 25. The only difference lies in that, a red light filter 26 corresponding to the color (red) of the laser spot is added between the CCD 24 and the half transparent and half reflecting mirror 22, for enhancing the brightness of the laser spot. Structures and functions of the other parts remain unchanged, and thus will not be described in detail.

Here, though the half transparent and half reflecting mirror 22 is a planar half transparent and half reflecting mirror, a wedge-shaped half transparent and half reflecting mirror may be adopted instead.

As shown in FIG. 5, with reference to the description for embodiment 1, a part of the light ray b incident on the half transparent and half reflecting mirror 22 from the zooming system 23, comprising the projection image and the image of the laser spot projected onto the projection image, is transmitted through the half transparent and half reflecting mirror 22 (the transmitted light ray is b1), while another part thereof is reflected (the reflected light ray is b2). Then the reflected light ray b2 is incident on the red light filter 26.

The red light filter 26 enhances the laser spot image in the light ray b2 by reducing the transmission of the light rays with other wavelengths, and obtains a light ray b5 (comprising the enhanced laser spot image). Then the light ray b5 is incident on the CCD 24.

Then, the CCD 24 performs capture according to the projection image and the laser spot image in the received light ray b5, obtains the captured projection image and laser spot image, and sends them to the processing system 25. The processing system 25 processes the captured projection image and laser spot image sent from the CCD 24 (such as brightness comparing), so as to acquire the coordinate of the laser spot.

Alternatively, the CCD 24 performs capture according to the projection image and the laser spot image in the received light ray b5, but only obtains the captured laser spot image due to the too low brightness of the projection image, and then only sends the captured laser spot image to the processing system 25. The processing system 25 processes the captured laser spot image sent from the CCD 24 (for example, comparing the captured laser spot image with the capture range of the CCD 24), so as to acquire the coordinate of the laser spot.

The projector according to the modified embodiment of the present invention can not only achieve the advantages of the above embodiments, but also enhance the laser spot image, and thus increase the contrast of the laser spot with respect to the projection image, so that the laser spot image is more easily identified from the projection image.

The red light filter 26 may also be applied to embodiment 2, in which the position and function thereof are identical with those described above. Of course, light filters corresponding to other colors (blue, green, etc.) of the bright spot may be used as well.

Additionally, in the three embodiments according to the present invention as described above, other optical parts such as lens, may be further included between the half transparent and half reflecting mirror 22 and the light source 21, and between the half transparent and half reflecting mirror 22 and the zooming system 23. That is to say, the half transparent and half reflecting mirror according to the present invention as described above may be set at any position between the light source and the zooming system.

Moreover, the present invention above only takes the laser spot as an example to illustrate the process in which the projector acquires the coordinate of the laser spot. However, the projector according to the present invention may also obtain bright sports emitted from other high brightness point light sources than the laser spot, such as an LED spot.

Other imaging devices, such as a complementary metal oxide semiconductor (CMOS) device and a junction field-effect transistor (JFET) device, may also be adopted in stead of the CCD 24.

In a word, the projector for acquiring the coordinate of the laser spot according to the present invention can acquire the coordinate of the bright spot in a simple, fast and accurate manner, without relying on the computer systems. As compared to the traditional manners, combining the projector with a computer lowers the cost of the whole system. The requirements for the imaging device, the projection area of the projector and its background are lowered, since it is sufficient to only capture the laser spot image. Further, it is possible to prevent the light rays from being subject to dispersions. Moreover, it is possible to improve the contrast of the laser spot with respect to the projection image by enhancing the laser spot image, so that the laser spot image is more easily identified from the projection image.

It is apparent for those skilled in the art to conceive other advantages and variants according to the embodiments as described above. Therefore, the present invention is not limited to the above specific embodiments, which only illustrate one form of the present invention in detail, by way of example. Those skilled in the art may obtain various solutions by equivalent substitutions based on the above embodiments without departing from the spirit of the present invention, which solutions should be contained in the scope of the claims of the present invention and equivalents thereof.

What is claimed is:

1. A projector for acquiring a coordinate of a bright spot, the bright spot being formed by an indicating light incident onto a projection area, the projector comprising:
    a light source configured to project and a zooming system, wherein a light ray emitted from the light source is projected onto the projection area to display a projection image via the zooming system;
    a half transparent and half reflecting mirror provided on a light path between the light source and the zooming system, for reflecting an external light ray, which is reflected from the projection area and then incident on the half transparent and half reflecting mirror via the zooming system, wherein reflection of the light ray and the indicating light from the projection area results in the external light ray which comprises the projection image and a bright spot image of the bright spot;
    an imager configured to capture the external light ray reflected by the half transparent and half reflecting mirror; and
    a processor configured to acquire the coordinate of the bright spot according to the bright spot image captured by the imager.

2. The projector for acquiring the coordinate of the bright spot according to claim 1, wherein, a light ray along the light path is incident on the half transparent and half reflecting mirror at a certain incident angle less than a total reflection angle of the half transparent and half reflecting mirror.

3. The projector for acquiring the coordinate of the bright spot according to claim 2, wherein, the half transparent and half reflecting mirror is a planar half transparent and half reflecting mirror.

4. The projector for acquiring the coordinate of the bright spot according to claim 2, wherein, the half transparent and half reflecting mirror is a wedge-shaped half transparent and half reflecting mirror with a predefined included angle which is twice of the incident angle.

5. The projector for acquiring the coordinate of the bright spot according to claim 3, wherein, the processor acquires the coordinate of the bright spot by comparing the bright spot image captured by the imager with the projection image captured by the imager, or by comparing the bright spot image captured by the imager with the capture range of the imager.

6. The projector for acquiring the coordinate of the bright spot according to claim 5, wherein, a light filter corresponding to the color of the bright spot is further provided between the half transparent and half reflecting mirror and the imager, for enhancing the bright spot image in the projection image reflected from the half transparent and half reflecting mirror.

7. The projector for acquiring the coordinate of the bright spot according to claim 6, wherein, the bright spot comprises a laser spot or an LED spot.

8. The projector for acquiring the coordinate of the bright spot according to claim 7, wherein, the imager is a charge-coupled device, a complementary metal oxide semiconductor device, or a junction field-effect transistor device.

9. A method for acquiring a coordinate of a bright spot, the bright spot being formed by an indicating light incident onto a projection area, the method comprising:
providing a light source and a zooming system, wherein a light ray emitted from the light source is projected onto the projection area to display a projection image via the zooming system;
providing a half transparent and half reflecting mirror on a light path between the light source and the zooming system, for reflecting an external light ray, which is reflected from the projection area and then incident on the half transparent and half reflecting mirror via the zooming system, wherein reflection of the light ray and the indicating light from the projection area results in the external light ray which comprises the projection image and a bright spot image of the bright spot;
capturing the external light ray reflected by the half transparent and half reflecting mirror; and
acquiring the coordinate of the bright spot, according to the captured bright spot image.

10. The method for acquiring the coordinate of the bright spot according to claim 9, wherein, the half transparent and half reflecting mirror is a planar half transparent and half reflecting mirror, or the half transparent and half reflecting mirror is a wedge-shaped half transparent and half reflecting mirror with a predefined included angle which is twice of the incident angle.

11. The method for acquiring the coordinate of the bright spot according to claim 10, wherein, the coordinate of the bright spot is acquired by comparing the captured bright spot image with the captured projection image, or by comparing the captured bright spot image with the capture range.

12. The method for acquiring the coordinate of the bright spot according to claim 9, wherein, a light filter corresponding to the color of the bright spot is further utilized in the capturing to enhance the bright spot image in the projection image reflected from the half transparent and half reflecting mirror.

13. The method for acquiring the coordinate of the bright spot according to claim 12, wherein, the bright sport comprises a laser spot or an LED spot.

* * * * *

UNITED STATES PATENT AND TRADEMARK OFFICE
CERTIFICATE OF CORRECTION

PATENT NO. : 8,079,714 B2
APPLICATION NO. : 12/161154
DATED : December 20, 2011
INVENTOR(S) : Shaoping Peng et al.

It is certified that error appears in the above-identified patent and that said Letters Patent is hereby corrected as shown below:

In the Specifications:

Col. 5, Line 29
  Delete "is"

Col. 6, Line 4
  Delete "lot"
  Insert --b1--

Signed and Sealed this
Twenty-eighth Day of May, 2013

Teresa Stanek Rea
*Acting Director of the United States Patent and Trademark Office*